United States Patent Office 2,778,712
Patented Jan. 22, 1957

2,778,712

DIGESTION OF PHOSPHATE ROCK

Paul Caldwell, Evergreen Park, Ill., assignor to Cannac Research and Development Company, a joint venture No Drawing. Application July 2, 1954,
Serial No. 441,150

8 Claims. (Cl. 23—109)

This invention relates to the production of citrate-soluble tricalcium phosphate and, more particularly, to the production of such a product in spite of the use of nitric acid for the digestion of phosphate rock from which the tricalcium phosphate is derived.

In the art of producing calcium phosphate fertilizers from fluorine-containing phosphate rock, it is a well established fact that the tricalcium phosphate obtained by nitric acid digestion of the rock followed by neutralization with ammonia is predominantly citrate-insoluble. Although this result is not characteristic of the phosphate obtained by hydrochloric acid digestion of phosphate rock, there are other drawbacks to the hydrochloric acid process which render the nitric acid digestion process potentially more attractive. Consequently, it has been conventional practice heretofore, in the precipitation of a calcium phosphate from the digestion mass resulting from the nitric acid digestion of phosphate rock, to alter the relative proportions of calcium and phosphorus in the aqueous digestion medium so as to correspond to the proportions of the calcium and phosphorus characteristic of dicalcium phosphate. This alteration has been effected by a variety of approaches, that is, either by decreasing the reactive calcium content of the digestion medium or by increasing the phosphorus component of the digestion medium. For example, the calcium component has been diminished either by adding a sulfate( such as sulfuric acid or potassium sulfate) or by carbonation and even by chilling to crystallize out a portion of the calcium nitrate from the aqueous digestion mass. The phosphorus content of the digestion mass has also been increased in prior practices by the addition of phosphoric acid. In the absence of using such an expedient as those mentioned hereinbefore, about 80% of the tricalcium phosphate precipitated from the digestion mass by ammoniation is in the form of completely citrate-insoluble tricalcium phosphate by the time it has been dried sufficiently to permit packaging or bulk shipment.

I have now discovered that if a significant amount of potassium chloride is added to and dissolved in the calcium nitrate-containing digestion mass, the tricalcium phosphate subsequently precipitated therefrom by ammoniation is predominantly citrate-soluble. Thus, my present invention is concerned with the production of a predominantly tricalcium phosphate product in the form of a precipitate obtained by ammoniation of an acidic aqueous medium resulting from the nitric acid digestion of fluorine-containing phosphate rock. This aqueous medium which is subjected to ammoniation in the practice of my invention contains the acid-solubilized calcium and phosphorus components of the rock in proportions such that the calcium component is present in amount substantially sufficient to combine with the phosphorus component in the form of tricalcium phosphate. In the practice of my invention, the thus-precipitated tricalcium phosphate is characterized by an increased resistance to reversion to a citrate-insoluble phosphatic product during subsequent drying, this characteristic being imparted to the product by adding to the calcium- and phosphorus-containing aqueous medium, prior to ammoniation, an amount of potassium chloride sufficient not only to provide a stoichiometric equivalent for the acid-soluble fluorine component of the rock in the form of potassium fluosilicate but to further provide a minimum of about one-third mol of potassium chloride per mol of calcium nitrate in the aqueous medium.

The method of my invention is applicable to the treatment of any phosphate rock. Preparation of the rock for digestion with nitric acid is substantially the same as that which prevails in the conventional digestion of such rock with sulfuric acid. Thus, satisfactory results can be obtained with rock ground to such a degree of fineness that 80–90% will pass through a 60 mesh screen (Tyler standard), although the rock may be more finely ground so that up to about 95% will pass through a 100 mesh screen. As in the case of other methods of digesting phosphate rock, the degree of subdivision of the rock is of importance only in so far as it affects the rate of its reaction with the digesting agent. Where the speed of reaction can be sacrificed somewhat for ease in separating the acid-insoluble portion of the rock, a coarser starting material such as 20 mesh or more coarse rock can be used. The rock may also be calcined prior to digestion in order to decompose organic matter and carbonates present in the rock. By decomposing the organic matter, any potassium fluosilicate separately recovered in practicing the invention will be cleaner in color (white), and by decomposing the carbonates before digestion there will be less foaming developed during the digestion operation. If the rock is calcined, the calcination temperature should be below that at which lime and silica present in the rock combined to form calcium silicate which interferes with filtration operations after the rock has been digested with the nitric acid.

The digesting agent used in the practice of the invention comprises such inorganic nitrogenous acids as nitric acid or the acid or acid mixtures obtained by the passage of gaseous nitrogen oxides through an aqueous medium. Thus, the nitrogenous acid may comprise nitric acid from a commercial source or it may comprise nitrogenous acids produced at the site of the digestion operation by the passage of gaseous nitrogen oxides through water or other aqueous liquor. Alternatively, the nitrogenous digestion agent may be produced in situ by passing gaseous nitrogen oxides through an aqueous suspension or slurry of the phosphate rock, the aqueous medium being either water, nitric acid of any concentration ranging from dilute to concentrated form, or either of these augmented by recycled liquor from the ammonia-neutralizing step.

The concentration of the nitrogenous digestion agent, which solely for convenience and not by way of limitation will be referred to herein and in the claims as "nitric acid," may range from dilute to concentrated form while nevertheless producing effective results. Dilute solutions of the nitric acid require more prolonged digestion periods than the concentrated acid, whereas the highly concentrated acid requires more care than the dilute acid in controlling the elevation of the temperature of the reaction mass which, if uncontrolled, promotes excessive volatilization of the acid. Thus, dilute nitric acid may be used with particular effectiveness in digesting very finely ground phosphate rock and relatively concentrated acid may be used satisfactorily in digesting more coarsely ground rock.

The amount of nitric acid required in the digestion stage will depend essentially upon economic considerations. Inasmuch as the nitric acid is more expensive than the phosphate rock, it is generally preferred to use such relative amounts of the rock and acid as will effect substantially complete utilization of the acid, but a balance should obviously be achieved between the degree of utilization of the acid and the degree of recovery of the phosphatic component of the rock. Where such a balance, decided upon economic grounds, results in incomplete dissolution of the available phosphatic component of the rock, the rock residue from the acid treatment may be added to a fresh charge of acid for further recovery of its phosphatic value.

The temperature maintained during the digestion operation is not critical although more elevated temperatures are conducive to more rapid digestion. The action of the nitric acid on the phosphate rock, being exothermic, tends to promote the development of an elevated temperature throughout the reaction mass so that it is generally unnecessary to apply extraneous heat to the digestion operation. The principal precaution to observe with respect to the temperature of the digestion operation is that the rate of reaction should be controlled, either by the rate of addition of the reagents or by their concentration, or by both, so as to avoid the development of temperatures which cause excessive volatilization of the acid from the reaction mass and also tend to increase the extent of foaming. The development of zones of local overheating is substantially eliminated by mechanical agitation of the digestion mass, this agitation preferably continuing throughout the entire reaction period. Foaming may be controlled not only by prior calcination of the rock but by mechanical foam breakers and the like.

During the course of the digestion operation, the tricalcium phosphate component of the phosphate rock is decomposed to form an aqueous medium characterized by the presence of dissolved phosphoric acid and calcium nitrate. The reaction mass resembles a thin slurry or suspension and generally does not set up as does the reaction mass resulting from sulfuric acid digestion of phosphate rock. Thus, sand and numerous other extraneous components of the phosphate rock which are not soluble in the nitric acid remain in suspension while the digestion mass is being agitated and settle when the reaction mass is allowed to become quiescent. The aqueous phase containing the phosphoric acid and calcium nitrate, as well as small amounts of phosphate complexes such as monocalcium phosphate, iron phosphates, aluminum phosphates, and other phosphorus-containing ions (other than the orthophosphates) such as phosphides, etc., may if desired then be largely separated from the insoluble material by decantation followed, if further desirable, by filtration or centrifuging or the like to remove that portion of the aqueous phase entrained in the sludge-like residue.

The resulting aqueous medium obtained by the nitric acid digestion of the phosphate rock contains not only phosphoric acid and calcium nitrate, in addition to small amounts of various other more complex compounds, but further contains at least a significant portion of the fluorine component of the rock in the form of fluosilicic acid. This fluosilicic acid is effectively removed from the aqueous medium by the addition of the potassium chloride pursuant to my invention. Although this result is readily achieved at substantially ambient temperature when the potassium chloride is added in the form of a solution thereof, the aqueous medium may advantageously be heated in order to facilitate dissolution of the potassium chloride when this chloride is added in the solid form. At such elevated temperatures (generally about 60° C. and higher) and with the further aid of vigorous mechanical agitation, a major portion of the fluosilicic acid in the aqueous digestion medium will be precipitated either immediately or when the aqueous medium is subsequently cooled. The resulting potassium fluosilicate precipitate may either be removed by filtration, or it may be left in the aqueous digestion medium and thus be carried over into the ultimate tricalcium phosphate product. If the potassium fluosilicate is separately recovered by filtration or the like, its color will be clearer if the rock has been calcined to remove organic matter and if acid-insoluble matter has been separated from the digestion mass prior to the addition of the potassium chloride.

Inasmuch as a portion of the added potassium chloride will be consumed by this precipitation of potassium fluosilicate, the amount of potassium chloride which is added pursuant to the practice of my invention should be sufficient not only to satisfy the stoichiometric requirements for the formation of potassium fluosilicate with the acid-solubilized fluorine component of the rock but should further provide a certain additional minimum amount of potassium chloride in the digestion medium. As nearly as I can presently ascertain, this additional minimum amount of potassium chloride which is required to impart citrate-solubility to the subsequently precipitated tricalcium phosphate pursuant to my invention approximates one-third of a mol of potassium chloride per mol of calcium nitrate in the aqueous digestion medium. This amount of potassium chloride will impart improved (though not complete) citrate-solubility to the tricalcium phosphate which is subsequently precipitated from the calcium nitrate-containing digestion medium by ammoniation, and still larger amounts of added potassium chloride further increase the degree of citrate-solubility of the tricalcium phosphate after it has been dried. For example, if the precipitated potassium fluosilicate is not removed from the digestion medium but is carried over into the final tricalcium phosphate product, the presence of about one-third of a mol of potassium chloride per mol of calcium nitrate in the digestion medium will yield a tricalcium phosphate product at least 70% of which is citrate-soluble. The presence of about two-thirds of a mol of potassium chloride per mol of calcium nitrate in the digestion medium yields a tricalcium phosphate product which is about 75% citrate-soluble, whereas about one mol of potassium chloride in the digestion medium increases the citrate-solubility of the tricalcium phosphate to about 80%. Still further additions of potassium chloride to the digestion medium do not markedly improve the citrate-solubility of the final product under the aforementioned conditions, as can be seen by the fact that one and one-third, one and two-thirds and two mols of potassium chloride per mol of calcium nitrate lead to the production of tricalcium phosphate products having citrate-solubilities of about 83%, 84% and 84%, respectively. On the other hand, considerably higher citrate-solubility is obtained if the precipitated potassium fluosilicate is removed prior to ammoniation. For example, after substantially complete removal of the precipitated potassium fluosilicate from the digestion medium, the presence of about one-third mol of potassium chloride per mol of calcium nitrate in this aqueous medium yields a tricalcium phosphate which is about 95% citrate-soluble. Increasing the potassium chloride in the digestion medium to about two-thirds mol per mol of calcium nitrate increases the citrate-solubility of the tricalcium phosphate to about 96%. When about one mol of potassium chloride is incorporated in the aqueous digestion medium per mol of calcium nitrate, the citrate-solubility of the tricalcium phosphate is increased to about 97%. One and one-third mols of potassium chloride further raise the citrate-solubility of the product to about 98%, whereas the addition of one and two-thirds mol of potassium chloride increases the citrate-solubility only slightly more, i. e. to about 99%, and this value can be increased to about 99.5% by the use of about two mols of potassium chloride per mol of calcium nitrate in the digestion medium. Of course, still larger quantities of potassium chloride can be used, but such larger quantities merely increase the potash content of the aqueous medium and thus increase the potash content of the final product when and if the aqueous medium from which tricalcium phosphate is precipitated is further evaporated to dryness in admixture with the tricalcium phosphate.

Hence, for the purposes of the invention, more than about 1½ mols of potassium chloride per mol of calcium nitrate produces no noteworthy increase in the citrate-solubility of the tricalcium phosphate, and in the absence of other considerations this is the economic upper limit for the potassium chloride. However, where a highly non-hygroscopic final product is desired, up to two mols of potassium chloride per mol of calcium nitrate may be used in accordance with the invention of my Patent No. 2,683,075. When the amount of potassium chloride used in practicing my present invention is as much as about two-thirds mol per mol of calcium nitrate, I have found it advantageous to add the potassium chloride in two stages in order that a single addition will not result in premature salting out of potassium nitrate if this aqueous mass is cooled prior to ammoniation for the purpose of completing the precipitation of the potassium fluosilicate. That is, about one-half to two-thirds of the potassium chloride is added first, then the aqueous medium is allowed to stand until the potassium fluosilicate has precipitated, and thereafter the remainder of the potassium chloride is added either with or without intervening separation of the precipitated potassium fluosilicate. The aqueous medium will thus contain all of the added potassium in solution, except for that precipitated as the fluosilicate, when the resulting aqueous medium is subjected to ammoniation.

The mechanism by which the addition of potassium chloride imparts citrate-solubility to the dried tricalcium phosphate which is precipitated by subsequent ammoniation is obscure. It is my present belief, however, that this result is at least in part attributable to the presence of a significant amount of ammonium chloride in the aqueous digestion medium, this ammonium chloride being formed by reaction between the ammonia and the potassium chloride. On the other hand, it appears possible that this favorable result may be largely attributable merely to the presence of chloride ions resulting from the addition of the potassium chloride. Regardless of the nature of the mechanism itself, there is no doubt about the effectiveness of the presence of the aforementioned amount of potassium chloride in the aqueous digestion medium in imparting to the tricalcium phosphate product precipitated by subsequent ammoniation the property of being predominantly citrate-soluble even after the tricalcium phosphate has been thoroughly dried.

The ammoniation of the potassium chloride-containing aqueous digestion mass may be readily effected with either anhydrous or aqueous ammonia, although anhydrous ammonia is preferred inasmuch as it is more consistent with the maintenance of high salt concentrations which are sometimes desirable as described hereinafter. Although the amount of ammonia added at this stage may vary considerably, it is my presently preferred practice to add sufficient ammonia to bring the final pH of the aqueous medium to a value just below 7. If the ammonia is added rapidly until the aqueous medium has a pH of 7, it will be found that the aqueous medium will thereafter revert to a pH of 5 to 6. On the other hand, if the ammonia is added slowly the final pH will remain at substantially the value of the pH at the termination of the ammoniation. Regardless of the rate of ammoniation, the amount of ammonia added to the potassium chloride-containing digestion medium should be that which will produce a final pH in the aqueous medium of less than 7, and preferably not exceeding about 6.5. The effect of such a final pH value less than 7, rather than one which exceeds 7, is that it further promotes the citrate-solubility of the tricalcium phosphate product. For example, when a final pH of about 5 was used, a tricalcium phosphate product obtained by the practice of my invention had a citrate-solubility of 99.6%, but when the product was obtained by an identical procedure except the attainment of a final pH of 7 the citrate-solubility of the product was only 98.6%. Amounts of ammonia which result in a final pH in excess of 7 may be used but counteract the improved citrate-solubility imparted to the tricalcium phosphate product by the use of potassium chloride pursuant to my invention. I have found that, in general, the advantages derived from the use of potassium chloride pursuant to the invention are most fully realized by controlling the ammoniation so that the final pH of the aqueous medium from which the tricalcium phosphate product is precipitated comes within the range of about 5 to 6. Final pH values below about 5 do not presently appear to lead to any more beneficial results.

The precipitated tricalcium phosphate-containing product (which generally further contains small amounts of dicalcium phosphate, ammonium phosphate, aluminum phosphate, iron phosphate and smaller amounts of various phosphides) may be separated from the aqueous medium and then dried, preferably without washing. However, I have found it particularly advantageous, in the production of fertilizer products containing this tricalcium phosphate, to forego the physical separation of the precipitated tricalcium phosphate and to evaporate the solid tricalcium phosphate-aqueous medium mixture to dryness. The resulting solid product of such an evaporative drying operation comprises not only predominantly citrate-soluble tricalcium phosphate but also potassium nitrate, ammonium chloride and ammonium nitrate. As the amount of potassium chloride used in the practice of my invention is increased above about one-third mol per mol of calcium in the aqueous digestion mass, the relative proportions of potassium nitrate and ammonium nitrate in the final dried product will change until substantially no ammonium nitrate is present (i. e. when at least about two mols of potassium chloride are used per mol of calcium). Substantially all of the nitrate will then be present in the form of potassium nitrate.

The following examples are illustrative of the practice of my invention, although it must be understood that the invention is not in any way limited to these specific operations:

*Example I*

The phosphate rock which was digested with nitric acid in this procedure was 72% B. P. L. Florida phosphate rock ground to 60% minus 100 mesh. The ground rock was added progressively to a mass of 2000 parts of 32% nitric acid until a total of 1020 parts by weight of the rock had been added. By thus controlling the rate of addition of rock to the acid, foaming was controlled during the digestion reaction. The temperature of the reaction mass was then maintained at about 60° C. for a period of 30 minutes during which the mass was continuously mixed to facilitate completion of the digestion reaction. After allowing the final reaction mass to settle for about 10 minutes, the aqueous phase was decanted. The remaining residue of this first digestion step was then treated with an additional 2000 parts of fresh 32% nitric acid for about 10 minutes. After allowing this second reaction mass to settle, the aqueous medium was decanted, leaving a discarded residue composed mostly of sand and clay. The decanted liquid was further admixed with 680 parts of fresh rock and was allowed to react for about 30 minutes. The resulting aqueous medium was decanted and the residue was treated with another lot of fresh acid. This process was repeated with the result that the combined decanted aqueous liquid contained 117 grams per liter of $P_2O_5$ and 65.4 grams per liter of nitrogen. The discarded sand and clay residue, after filtering and washing, contained only about 0.3% $P_2O_5$.

After filtering the decanted acidic liquid containing the aforementioned proportions of $P_2O_5$ and nitrogen, the clear solution was heated to 65° C. To 500 parts by volume of this calcium nitrate- and phosphoric acid-containing solution, there was added a hot clear solution made up from 100 parts by weight of 60% commercial potassium chloride. Thus, for each 1.17 mols of calcium nitrate there was added 1.15 mols of potassium chloride over and above that amount of the potassium chloride which combined with the acid-solubilized fluorine component of the rock to precipitate potassium fluosilicate. The resulting mixture was then cooled to 25° C. to precipitate the potassium fluosilicate, and this precipitate was removed by filtering. The filtrate was then continuously stirred while ammonia gas was introduced thereinto at a rate such that the pH of the aqueous medium rose to 7 in a period of about 15 minutes. As soon as this pH was attained, the ammoniation was terminated. Upon standing for a short period of time, the pH of the aqueous medium dropped to about 5. The resulting ammoniated mass, comprising an aqueous phase having a pH of about 5 as well as a precipitated tricalcium phosphate product, was then evaporated to dryness without permitting the temperature to exceed about 100° C. The resulting dried solid product, composed of the precipitated tricalcium phosphate product plus the dissolved salt components of the ammoniated aqueous medium, had the following chemical analysis:

|  | Percent |
|---|---|
| $H_2O$ | 1.46 |
| N | 13.50 |
| Total $P_2O_5$ | 13.35 |
| Citrate-insoluble $P_2O_5$ | .10 |
| Citrate-soluble $P_2O_5$ | 13.25 |
| $K_2O$ | 13.86 |

*Example II*

The procedure described in Example I was repeated except that the amount of potassium chloride solution which was added provided only ⅓ mol of potassium chloride per mol of calcium nitrate over and above that amount of potassium chloride consumed in the formation of potassium fluosilicate. The resulting tricalcium phosphate-containing product had the following chemical analysis:

|  | Percent |
|---|---|
| $H_2O$ | 1.50 |
| N | 15.81 |
| Total $P_2O_5$ | 15.64 |
| Citrate-insoluble $P_2O_5$ | 1.00 |
| Citrate-soluble $P_2O_5$ | 14.64 |
| $K_2O$ | 5.41 |

It will be seen, accordingly, that my invention makes possible for the first time the production of a predominantly citrate-soluble tricalcium phosphate product from phosphate rock through the medium of nitric acid as the rock-digesting agent. It will also be readily apparent that this result is obtained pursuant to my invention by the use of potassium chloride which serves a unique function under the specific environment conditions which prevail during the precipitation of tricalcium phosphate by ammoniation of the aqueous digestion mass resulting from the nitric acid digestion of phosphate rock. Still further improvement in the citrate-solubility of the product can also be obtained, as described hereinbefore, by effecting ammoniation of the potassium chloride-containing aqueous digestion medium under conditions such that the final pH of this aqueous medium is substantially less than 7. It will also be readily understood that the product obtained by the practice of my invention, though identified herein and in the claims as "tricalcium phosphate," will not necessarily be composed exclusively of tricalcium phosphate inasmuch as various other phosphates, phosphides, etc., will be present in the product precipitated by the ammoniation, as clearly explained hereinbefore. Moreover, the extraneously added components may be incorporated in the final product without departing from the spirit and practice of my invention; for example, some extraneous phosphoric acid may be added to the calcium nitrate- and phosphoric acid-containing acid digestion medium prior to ammoniation so as to incorporate in the final "tricalcium phosphate product" an increased amount of dicalcium phosphate. Such expedients are well known in this art and may be incorporated in my process without departing from the spirit of the invention.

This application is a continuation-in-part of my application Serial No. 230,077, filed June 5, 1951, which has issued as Patent No. 2,683,075.

I claim:

1. In the production of tricalcium phosphate in the form of a precipitate obtained by ammoniation of an acidic aqueous medium resulting from the nitric acid digestion of fluorine-containing phosphate rock, said aqueous medium which is subjected to ammoniation containing the acid-solubilized calcium and phosphrous components of the rock in proportions such that the calcium component is present in amount substantially sufficient to combine with the phosphorus component in the form of tricalcium phosphate, the improvement which comprises imparting to the thus-precipitated tricalcium phosphate product an increased resistance to reversion to a citrate-insoluble phosphatic product during subsequent drying by adding to said calcium-containing aqueous medium prior to ammoniation an amount of potassium chloride sufficient not only to provide a stoichiometric equivalent for the acid-soluble fluorine component of the rock in the form of potassium fluosilicate but to further provide from about one-third mol to about one and one-half mols of potassium chloride per mol of calcium nitrate in said aqueous medium.

2. The method according to claim 1 in which the amount of added potassium chloride is sufficient to provide about one mol of potassium chloride per mol of calcium nitrate in said aqueous medium.

3. In the production of tricalcium phosphate in the form of a precipitate obtained by ammoniation of an acidic aqueous medium resulting from the nitric acid digestion of fluorine-containing phosphate rock, said aqueous medium which is subjected to ammoniation containing the acid-solubilized calcium and phosphorus components of the rock in proportions such that the calcium component is present in amount substantially sufficient to combine with the phosphorus component in the form of tricalcium phosphate, the improvement which comprises imparting to the thus-precipitated tricalcium phosphate product an increased resistance to reversion to a citrate-insoluble phosphatic product during subsequent drying by adding to said calcium-containing aqueous medium prior to ammoniation an amount of potassium chloride sufficient not only to provide a stoichiometric equivalent for the acid-soluble fluorine component of the rock in the form of potassium fluosilicate but to further provide from about one-third mol to about one and one-half mols of potassium chloride per mol of calcium nitrate in said aqueous medium, and by removing the precipitated potassium fluosilicate from the resulting aqueous medium prior to said ammoniation.

4. The method according to claim 3 in which the amount of added potassium chloride is sufficient to provide about one mol of potassium chloride per mol of calcium nitrate in said aqueous medium.

5. In the production of tricalcium phosphate in the form of a precipitate obtained by ammoniation of an acidic aqueous medium resulting from the nitric acid digestion of fluorine-containing phosphate rock, said aqueous medium which is subjected to ammoniation containing the acid-solubilized calcium and phosphorus components of the rock in proportions such that the calcium component is present in amount substantially sufficient to combine with the phosphorus component in the form of tricalcium phosphate, the improvement which comprises imparting to the thus-precipitated tricalcium phosphate product an increased resistance to reversion to a citrate-insoluble phosphatic product during subsequent drying by adding to said calcium-containing aqueous medium prior to ammoniation an amount of potassium chloride sufficient not only to provide a stoichiometric equivalent for the acid-soluble fluorine component of the rock in the form of potassium fluosilicate but to further provide from about one-third mol to about one and one-half mols of potassium chloride per mol of calcium nitrate in said aqueous medium, and effecting said ammoniation to such an extent that the final pH of the ammoniated aqueous medium will be less than 7.

6. The method according to claim 5 in which the ammoniation is effected to such an extent that the final pH of the ammoniated aqueous medium will be within the range of 5 to 6.

7. In the production of tricalcium phosphate in the form of a precipitate obtained by ammoniation of an acidic aqueous medium resulting from the nitric acid digestion of fluorine-containing phosphate rock, said aqueous medium which is subjected to ammoniation containing the acid-solubilized calcium and phosphorus components of the rock in proportions such that the calcium component is present in amount substantially sufficient to combine with the phosphorus component in the form of tricalcium phosphate, the improvement which comprises imparting to the thus-precipitated tricalcium phosphate product an increased resistance to reversion to a citrate-insoluble phosphatic product during subsequent drying by adding to said calcium-containing aqueous medium prior to ammoniation an amount of potassium chloride sufficient not only to provide a stoichiometric equivalent for the acid-soluble fluorine component of the rock in the form of potassium fluosilicate but to further provide a minimum of about one-third mol of potassium chloride per mol of calcium nitrate in said aqueous medium, effecting said ammoniation to such an extent that the final pH of the ammoniated aqueous medium will be less than 7, and removing the precipitated potassium fluosilicate from the resulting aqueous medium prior to said ammoniation.

8. The method according to claim 7 in which the ammoniation is effected to such an extent that the final pH of the ammoniated aqueous medium will be within the range of 5 to 6.

References Cited in the file of this patent

UNITED STATES PATENTS 2,683,075    Caldwell _____ July 6, 1954